United States Patent [19]

Johnson

[11] Patent Number: 4,495,755
[45] Date of Patent: Jan. 29, 1985

[54] CONVEYOR FOR A COMBINE HARVESTER
[75] Inventor: David W. Johnson, Bennet, Nebr.
[73] Assignee: The Goodyear Tire & Rubber Company, Akron, Ohio
[21] Appl. No.: 515,338
[22] Filed: Jul. 19, 1983
[51] Int. Cl.³ ................... A01D 43/02; A01D 89/00
[52] U.S. Cl. ........................................ 56/364; 56/400; 198/698
[58] Field of Search ............. 56/364, 400, 400.21; 198/697, 698, 699, 688

[56] References Cited
U.S. PATENT DOCUMENTS 2,704,150 3/1955 Scranton ............................... 56/400
2,839,885 6/1958 Eischens ............................... 56/364
3,206,920 9/1965 Hofer ................................... 56/400
3,362,480 1/1968 Barber ................................. 56/400
3,481,125 12/1969 Miller .................................. 56/400
4,202,159 5/1980 Young .................................. 56/364

Primary Examiner—Robert P. Swiatek
Assistant Examiner—David I. Tarnoff
Attorney, Agent, or Firm—R. D. Thompson

[57] ABSTRACT

A flexible endless conveyor for a harvester pickup apron comprises a number of side-by-side belts having a plurality of integrally molded elastomer cleats raised from the surface of each belt, oriented in a plurality of rows across the width of each belt. Each cleat has a bore therethrough with an axis parallel to the base of the belt and perpendicular to the longitudinal direction of the belt. Crop gathering tines are mounted on each cleat by fitting an aperture in tine body over each cleat and inserting a rod through both a bore in the tine body and the bore in the cleat. The conveyor is useful in a crop gathering machines such as combines and balers.

13 Claims, 11 Drawing Figures

CONVEYOR FOR A COMBINE HARVESTER

BACKGROUND OF THE INVENTION

This invention generally relates to combine harvesters and more particularly to an improved flexible belt conveyor for a pickup apron as may be used on combines or windrow-type farm machinery such as grain harvesters and balers.

BACKGROUND ART

There are many known configurations of draper pickup aprons in the prior art and for each of these known configurations there are numerous arrangements of apparatus for attaching the crop gathering tines that are mounted on the pickup apron for the purpose of carrying the crop to the combine auger for separating the grain, baling and/or other processing. Most of these prior art conveyor configurations suffer from having a multiplicity of parts such as plates, brackets, rivets, fasteners that are used to fasten the tines to the flexible apron. The breakage or loss of any of the multiplicity of such parts during the limited harvesting period is very costly. The down time incurred during harvesting is especially critical because of the limited time in which the harvest of the particular crop must be completed. The complex configurations involving multiple parts suffer from the operational problem during harvesting of grain stocks, weeds and vines becoming entangled on the multiple projections of these configurations. This debris must be manually removed. Another known configuration uses a reinforced elastomeric belt with raised cleats and holes arranged across the width of the belt through which tines are fastened. This design suffers from the operational problem of having grain stocks and other debris lodged in the multiplicity of holes in the reinforced belt. In addition, the holes in the belt lessen the integrity of the belt and the holes become stress centers during operation. The holes become the origin for stress cracking and eventual failure of the belt. Thicker belts can be utilized to overcome the problem but this solution raises additional problems of reduced flexibility of the belt which in turn limits the minimum pulley diameters which can be used on the crop pickup assembly. In addition, the method of manufacture of this belt is expensive due to the additional manufacturing step of cutting the holes in the reinforced belt carcass prior to installation of the steel tines.

In view of these and other problems associated with the present draper-type aprons for combine harvesters and balers, this invention provides the following advantages: a flexible belt conveyor that eliminates a multiplicity of fasteners and provides a simple mechanism for attaching and detaching crop gathering tines; a flexible belt which has a body which has unbroken integrity with no holes, rivets or bolts projecting through it for accessory attachment, a pickup belt for a combine harvester or baler that offers easy removal of broken or lost tines; a pickup apron which resists the accumulation of debris during crop gathering operations; and a pickup belt which eliminates the need to mechanically fasten the tines through the belt thus eliminating any rivet or bolt heads on the inside of the belt making it more flexible and less likely to slip on the drive pulleys.

These and other advantages are accomplished in a flexible endless conveyor for a harvester pickup apron comprising in combination an elastomeric belt having a reinforced base and a plurality of integrally molded elastomeric cleats raised from the surface of the base and oriented in a plurality of rows across the width of the belt with adjacent cleats interrupted by a space exceeding the largest dimension of said cleats, each of said cleats having a cleat bore therethrough with an axis parallel to the base of the belt, said cleat bores being aligned substantially perpendicular to the longitudinal direction of the belt a plurality of tine bodies mounted on said cleats, each tine body having a cleat aperture therein substantially equal in dimension to the dimension of said cleats and having a tine mounting bore intersecting said cleat aperture such that said tine mounting bore substantially aligns with said cleat bore when said tine bodies are mounted on said cleat, said tine bodies having at least one flexible tine attached thereto, a means for detachably attaching said tine bodies to said cleats through the tine mounting bore and the cleat bore.

BRIEF DESCRIPTION OF THE DRAWINGS

The features and advantages of the invention will be better understood from a consideration of the following description when taken in conjunction with the accompanying drawings in which.

DETAILED DESCRIPTION OF THE INVENTION

Figure 1:
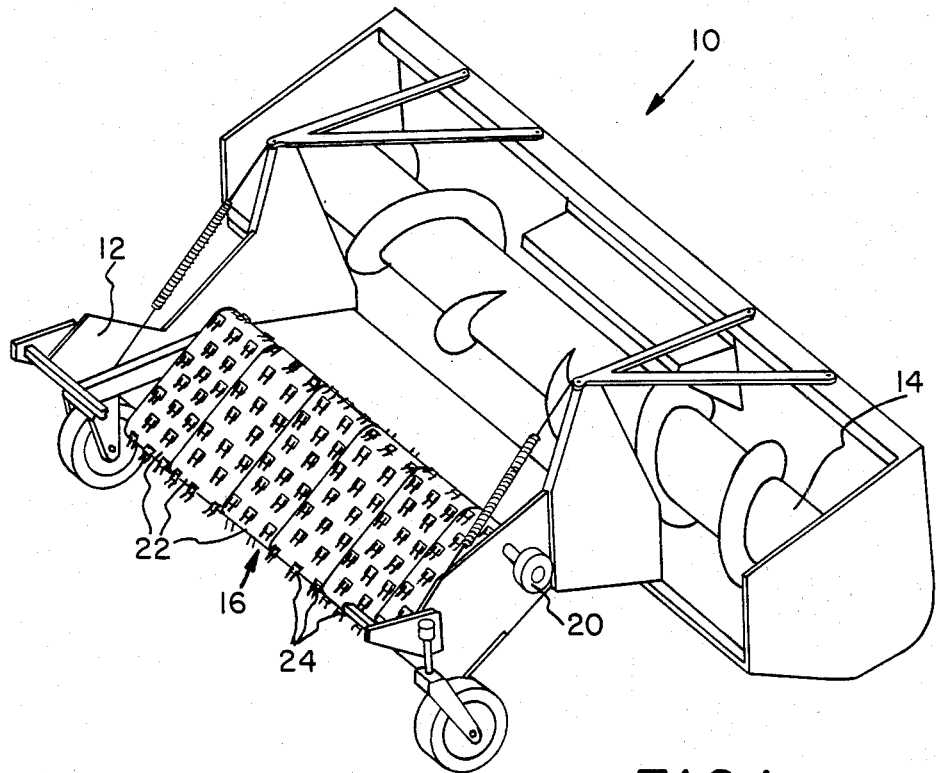
FIG. 1 is a perspective view of the forward end of a harvester platform on which is mounted a draper pickup conveyor embodying the instant invention.

FIG. 1 shows the forward end of a combine harvester generally indicated by reference numeral 10 which includes a crop pickup assembly 12 for gathering crops and feeding them into the area of a conventional harvester auger 14. The pickup assembly 12 includes a flexible conveyor generally indicated by numeral 16 that is driven by suitable drive means 20. The flexible conveyor is positioned and supported by suitable means, such as a pulley system illustrated in FIG. 4. The conveyor 16 comprises at least one and preferably a series of side-by-side mounted flexible belts 22 which carry a plurality of crop gathering tines 24 on the surface and which effect pickup of the crop as the belts rotate and the harvester moves in a forward direction. Draper pickup attachments for combine harvesters of the type described are manufactured by the Melroe Division of the Clark Equipment Company, Gwinner, N.D.

Figure 2:
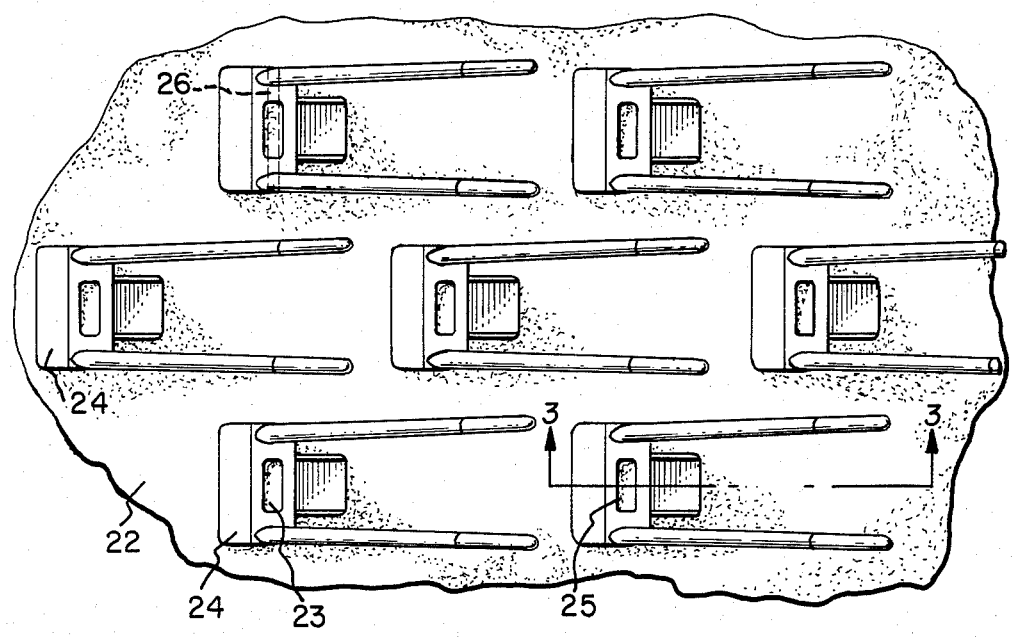
FIG. 2 is a plan view of one of the belts comprising the conveyor showing several crop gathering tines mounted on the belt.

FIG. 2 shows a section of one of the elastomeric belts 22 which are used in side-by-side combination to form a conveyor. The belt 22 has a longitudinal direction and a transverse direction. Preferably the belt 22 may be made and vulcanized in an endless loop by well known and recognized methods in the belt art. Alternatively each belt may be formed in sections with said sections being coupled together by means such as wire lacing, hooks or staples to form a continuous loop for use on the draper pickup assembly 12 of FIG. 1. Each belt 22 has a plurality of integrally molded elastomeric cleats 23 which rise from the surface of the belt and are oriented in a plurality of rows across the width of the belt as shown in FIG. 1 with adjacent cleats 23 interrupted by a space which exceeds one-half the transverse dimension of the molded elastomeric cleats. The number of cleats will depend upon the final width of the belt as well as the type of crop which will be gathered by the harvester. Each cleat 23 has mounted thereon a tine body generally indicated by reference numeral 24. Each tine body 24 has an aperture 25 which is substantially equal to the dimensions of the cleat 23 which fits within the aperture 25. The aperture 25 may extend completely through the tine body 24 or it may be a cavity of appropriate dimension within the tine body.

Figure 3:
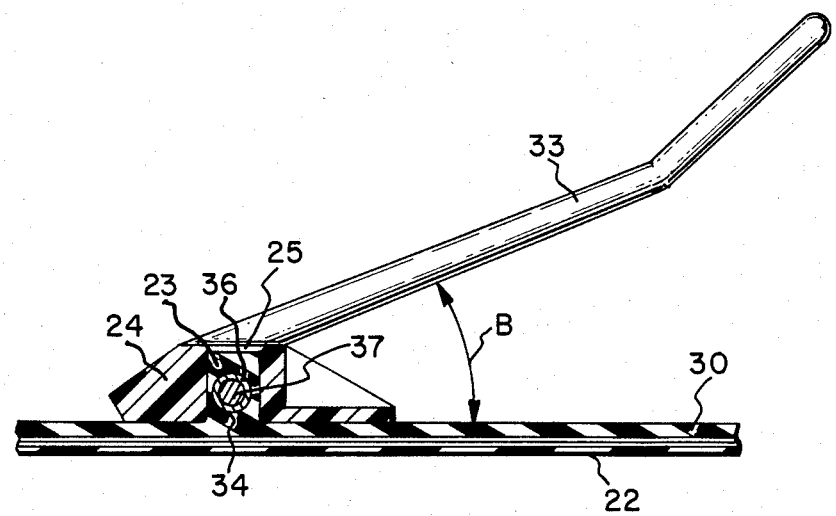
FIG. 3 is a cross-sectional view of the belt of FIG. 2 taken along line 3—3.

FIG. 3 provides further cross-sectional detail of the structure of the elastomeric belt and the tine body. FIG. 3 is a cross-sectional view taken along line 3—3 on FIG. 2. The elastomeric belt 22 is composed of a base 30 composed of an elastomeric matrix material. The base 30 is of integral unitary construction having a uniform cross-section with no holes or openings in it. The base 30 preferably contains one or more reinforcement layers 35 embedded therein for added strength. The cleats 23 are integrally molded as a part of the base 30 and are fully coextensive therewith. The selection of elastomeric materials and reinforcement layers are within the skill of persons knowledgeable in the belt making art. Reinforcing fabrics made from nylon, polyester, rayon are exemplary types used in such belts. Synthetic rubbers and natural rubber are commonly used elastomers for the elastomeric matrix and cleats. Thermoplastic polymers having flexibility suitable for the application may be used as well. Illustrative of such materials are ethylene-propylene copolymers mixed with polypropylene, polyvinylchloride, nylon, etc. FIG. 3 illustrates a bore extending through cleat 23 having an axis parallel to the base of the belt 22. The bores 34 through each cleat 23 in the plurality of rows are aligned substantially perpendicular to the longitudinal direction of the belt 22. The cleat bore 34 is shown in FIG. 3 to have a circular cross-section although any geometrical shape including triangular, square or rectangular may be utilized for this bore 34. The positioning of the bore may be centered in the cleat or the bore may be adjacent to an edge of the cleat. For example, the cross-sectional bore form may be a semi-circle open on the vertical face of the cleat 23 such as to form a longitudinal groove in the cleat parallel to the base. The tine body generally indicated by the reference numeral 24 contains an aperture 25 which is of the same cross-sectional dimension as the cleat 23 which fits within this aperture. The aperture 25 may extend completely through the tine body 23 or it may be a cavity closed on the upper end. The tine body 23 contains a tine mounting bore 26 as shown by the hidden lines on only one tine body in FIG. 2. The cross-section of the tine mounting bore 26 may be different, but is preferably of the same geometry as the cleat bore 34, and is aligned in the tine body 24 in such a manner that when the tine body 24 is placed over the cleat 23 the cleat bore 34 and the tine mounting bore 26 are perfectly aligned to form a bore extending completely through the tine body and cleat in the transverse direction of the belt. The tine body 23 includes at least one tine 33 extending therefrom at an approximate angle $\beta$ of between 15° to 55° where $\beta$ is measured between the tine 33 and the base 30 of the elastomeric belt 22. Design preference may indicate that the tine 33 may contain other angular configurations as may be determined by one skilled in the art.

The tine bodies 24 are detachably mounted on cleats 23 by a suitable attaching means. A rod 37, exemplary of an attachment means, is shown in FIG. 3. Rod 37 extends through the tine mounting bore and the cleat bore. Preferably the attaching means such as rod 37 may be maintained in its position by any suitable means for fastening such as a cotter pin, bolt or snap rings which may be located just externally and adjacent to the tine body. An alternative fastening means may be a set screw which is inserted through an additional threaded bore (not shown) in the tine body which intersects the tine mounting bore 26 allowing the set screw to engage the rod 37 and thus restrict its lateral movement.

While the conveyor belt configuration herebefore described will meet the needs of most crop gathering applications there may be instances where it may be desirable to reinforce the cleat bores, FIG. 3 shows optional bushings 36 which may be vulcanized directly to the elastomer of the cleat 23. The bushings 36 would completely surround the cleat bore to provide additional support and strength to the bore. The rod 37 will then be carried in this alternate embodiment by the bushings embedded in each cleat and thus provide a stronger mounting configuration for particular heavy duty crop gathering applications.

Figure 5:
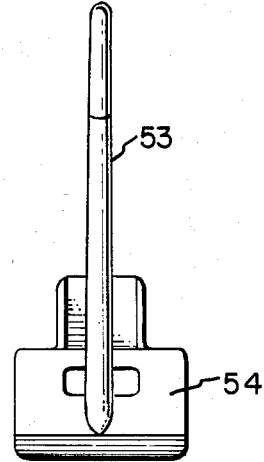
FIG. 5 is a top view showing an alternative tine configuration utilizing a single crop gathering tine.
Figure 6:
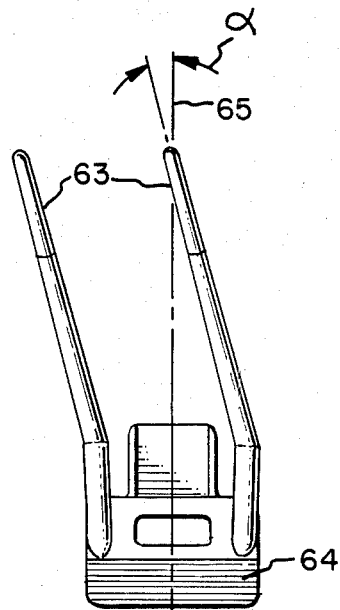
FIG. 6 is an alternative dual tine configuration using tines which are set at angles.

All tine bodies and tines described herein may be composed of suitable flexible, yet resilient materials known to be useful in the art such as heavy gauge spring steel and various thermoplastic and thermosetting polymers such as nylon, ultra high density polyethylene, polycarbonate, etc. Two alternative embodiments of useful tine body configurations are shown in FIG. 5 and FIG. 6. In FIG. 5 a single tine 53 extends perpendicularly from the tine body 54. In FIG. 6, a dual tine configuration is shown where the tine 63 is bent at an angle $\alpha$ from the longitudinal centerline 65 of the tine body 64. The angular relationships of the tine 63 as shown in FIG. 6 is useful when the rows of cleats are aligned in such a manner that the tine bodies are aligned directly behind the tine bodies in the preceding row. The angular relationship of the tines to the tine body as shown in FIG. 6 can be useful in such a configuration to assure that during the operation of the conveyor the tines do not interfere with the operation of the preceding row of tines. Any of the tine embodiments may be utilized with different configurations for attaching the tine bodies to the belts for use in flexible conveyors of this invention.

Figure 4:
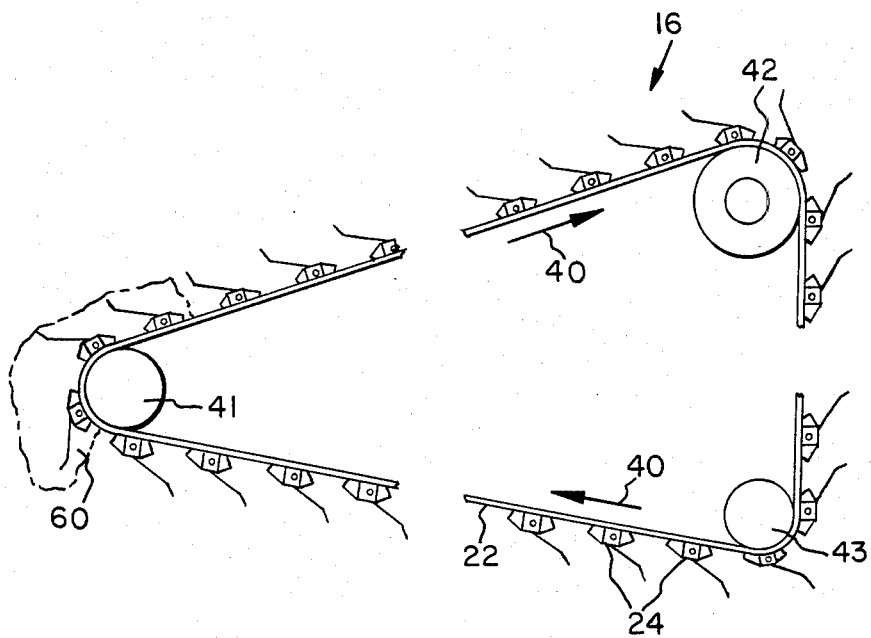
FIG. 4 is a side elevational view illustrating the action of the belt/tine combination as the belt traverses a pulley while mounted in the harvester platform of FIG. 1.

FIG. 4 illustrates the operation of the flexible endless conveyor 16 as shown in FIG. 1 during harvesting operations. The belt 22 traverses a forward pulley 41 and an upper and a lower tail pulley 42 and 43 respectively, moving in the direction of the arrow 40 toward the combine auger (not shown). The belt 22 moves in a forwardly directly indicated by arrows 40 to engage and pickup the crop 60. As clearly shown in the drawings, the tines 24 extend downwardly in a crop engaging action and have the ability to flexibly conform to the terrain or obstructions on the surface thereof. As each individual tine body 24 traverses the forward pulley 41, the crop 60 is picked up and deposited on the belt 22 for conveyance toward the lower tail pulley 43 where the crop is dropped into a conventional harvesting auger (not shown).

Figure 7:
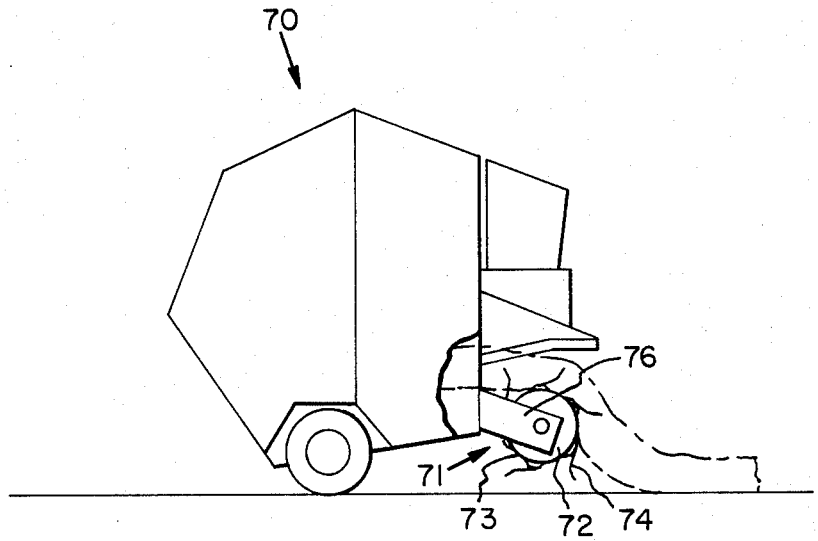
FIG. 7 is a schematic representation of a baling device.

FIG. 7 illustrates an alternative application for the belts and flexible conveyor of this invention. A hay baler 70 is shown which is operated in a field being harvested while being drawn behind a tractor (not shown). The crop pickup assembly 71 of the baler is rotatably attached to hay baler 70 and includes a frame 76 and a flexible, endless conveyor 72, showing side view, which is driven by suitable means to allow the crop gathering tine 74 to engage and pick up windrow crops 75 from the field. The flexible conveyor 72 is composed of one or more flexible belts 73 which are shown only in edge view of FIG. 7. The flexible belts 73 are similar in all respects to the belt 22 illustrated in FIG. 2 and FIG. 3. The flexible belts 73 have mounted thereon a multiplicity of crop gathering tines 74 which are similar in all respects to the tine body 24 shown in FIG. 3 and may alternatively be of the configurations depicted in FIGS. 5, 6, 8, 10 and 11. While the flexible conveyor 72 is shown in FIG. 7 as being a cylindrical configuration, of course, it may be of any other suitable configuration such as the one shown in FIG. 4. The hay baler 70 may preferably produce large round bales or any other finished crop forms.

Figure 8:
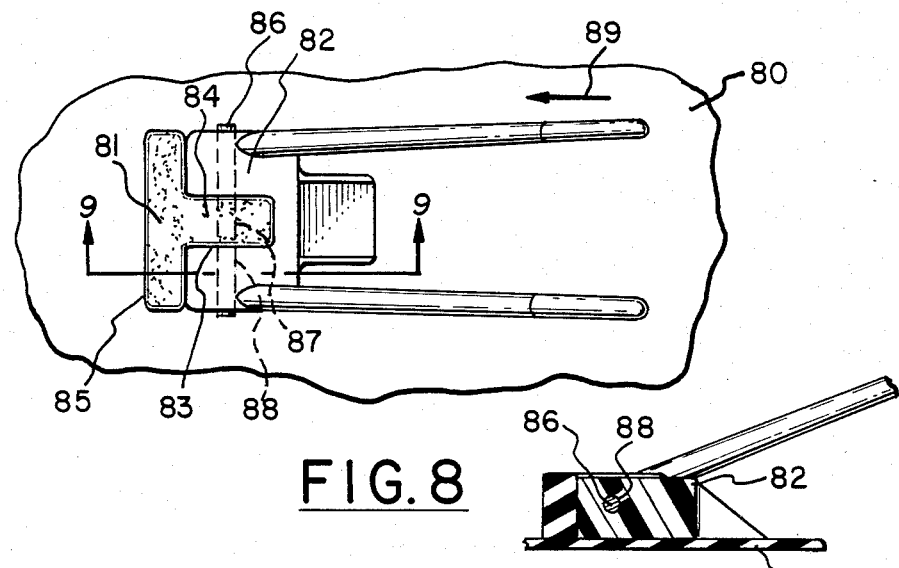
FIG. 8 is a plan view of a portion of one of the belts comprising the conveyor showing alternative cleat and tine body configurations.

FIG. 8 shows a portion of a belt 80 which has an alternative cleat configuration where the cleat is molded coextensively with the elastomeric belt surface in a T-shaped configuration 81. The leg 84 of the T-shaped cleat is perpendicular to the cross-member 85 and is oriented in the longitudinal direction of the belt, preferably away from the direction of travel 89 of the belt. The tine body 82 includes a cleat aperture 83 which is substantially the same dimensions as the leg 85. The cleat 81 has a cleat mounting bore 87, shown with hidden lines, which is aligned with a tine mounting bore 88, shown with hidden lines, through which a means for detachably attaching the tine body 82 to the cleat 81. This embodiment minimizes the possibility of having debris being caught between the tine body and the upper belt surface during crop gathering operations. By utilizing the cleat as the leading edge for the tine body, this design minimizes the accumulation of debris during harvesting operation.

Figure 9:
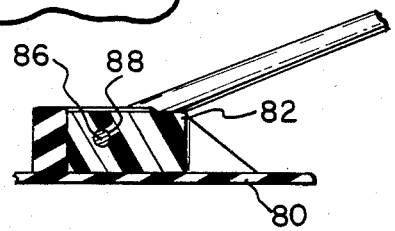
FIG. 9 is a sectional view of tine body and belt section along 9—9 of FIG. 8.

FIG. 9 shows a sectional view taken along line 9—9 from FIG. 8. Tine body 82 contains a tine mounting bore 88. A pin 86 is shown as an illustrative means for detachably attaching the tine body 82 to the belt 80.

Figure 10:
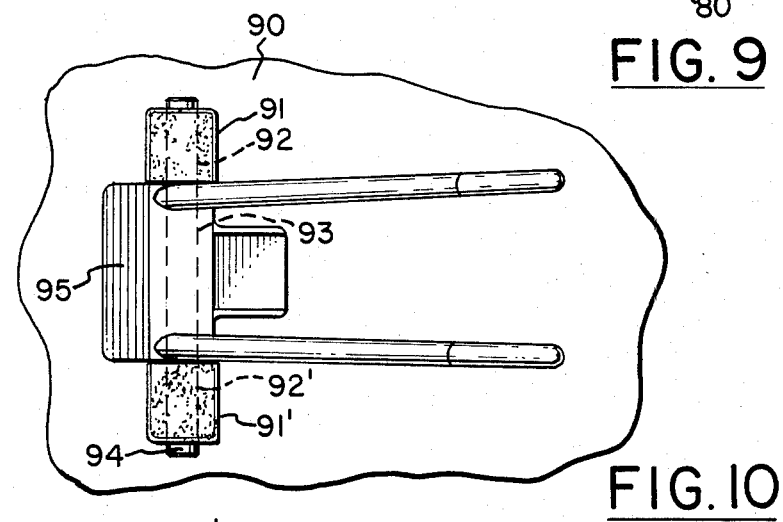
FIG. 10 is a plan view of a portion of one of the belts comprising the conveyor showing an alternative arrangement of tine bodies and cleats.

FIG. 10 sets out an alternative embodiment of the invention where the tine body 95 is positioned between two transversely adjacent cleats 91 and 91' which are elastomeric and are molded integrally and coextensively with the elastomeric belt 90. The adjacent cleats 91 and 91' have cleat bores 92 and 92' shown as hidden lines that are similar in all respects to cleat bore 34 shown in FIG. 3. The tine body 95 contains a tine mounting bore 93 shown with hidden lines which aligns with cleat bores 92 and 92'. Any suitable means for detachably attaching tine body 95 to adjacent cleats 91 and 91' may be utilized. A mounting pin 94 is shown as a exemplary method.

Figure 11:
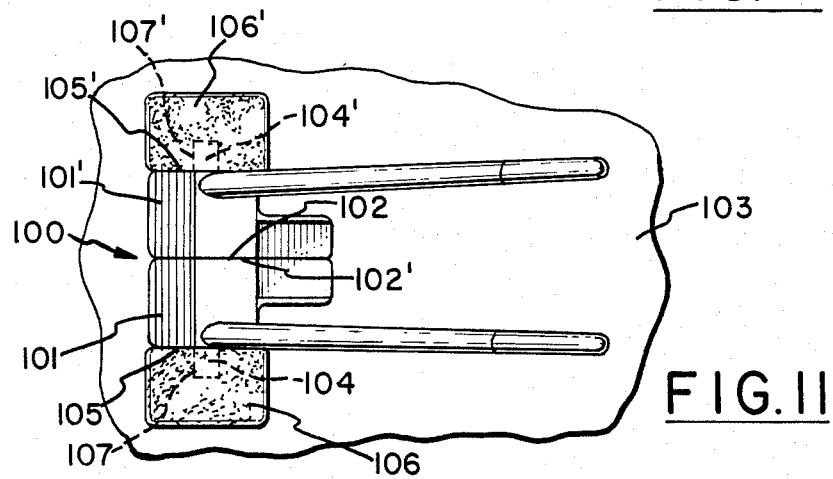
FIG. 11 is a plan view of a belt portion showing an alternative split tine body configuration between adjacent cleats.

FIG. 11 illustrates an alternative embodiment of tine body configuration. The tine body 100 is composed of a left portion 101 and a right portion 101' which are substantially mirror images of each other. The left portion 101 has a mating surface 102 which contacts a mating surface 102' of right portion 101' when the tine body is assembled as shown in FIG. 11 on an elastomeric belt 103 for use as a part of a flexible endless conveyor of this invention. Elastomer belt 103 is similar in all respects to belt 22 of FIG. 2. The left portion 101 has a pin 104 extending substantially perpendicularly from the cleat engaging surface 105. The right portion 101' similarly, has a pin 104' extending away from its cleat engaging surface 105'. The pins 104 and 104', shown with hidden lines, are oriented to engage and enter the cleat bore 107 and 107', shown with hidden lines, of the transversely adjacent cleats 106, 106' when the left and right mating surfaces 102 and 102' are placed together during assembly of tine body 100 between two transversely adjacent elastomeric cleats 106 and 106' of an elastomeric belt 103. Suitable means for securing the left portion 101 and right portion 101' together may be used as required by the particular application. Snap innerlock mechanisms, bolts, pins or adhesive bonding are illustrative methods of securement which may be used as necessary.

The advantage to the design of the belt of this invention is best illustrated in the actual operation of the belt compared to prior art belts having molded cleats with openings punched through the belt carcass. The belt and conveyor of this invention are superior in that a lighter weight, more flexible belt may be utilized over smaller diameter head and tail pulleys to enable the crop gathering system to be highly efficient and yet light weight. In the prior art belts, the openings punched in the belt lead to fatigue failure of the underlying belt at the openings. In addition, the exposed reinforcing layers would be subject to ripping of the reinforcement layers and ingress of moisture into the body carcass of the underlying belt. In addition the prior art belts suffered from the tendency to pick up rocks, grain stocks and debris in the area of the openings in the belt. The belt of this invention is a solid continuous belt having no holes or openings punched through it for any purpose, thus its integral construction leads to a exceptionally strong and light weight conveying system for crop harvesting equipment. An additional advantage of this belt which is specific to grain harvesting is that there is no loose grain lost through the belts since they have an integral and unbroken surface with no holes in the belt carcass.

While certain representative embodiments and details have been shown for the purpose of illustrating the invention it will be apparent to those skilled in the art that various changes and modifications may be made therein without departing from the scope of the invention.

What is claimed is:

1. A flexible endless conveyor for a harvester pickup apron comprising in combination:
 at least one elastomeric belt having a longitudinal direction and a transverse direction and an elastomeric base with a plurality of integrally molded elastomeric cleats raised from the base and oriented in a plurality of transverse rows across the belt with transversely adjacent cleats interrupted by a space exceeding one-half the transverse dimension of said cleats, each of said cleats having a cleat bore therethrough with an axis parallel to the base, said cleat bores being aligned substantially perpendicular to the longitudinal direction of the belt;

a plurality of tine bodies mounted on said belt, each tine body having a tine mounting bore therethrough with an axis substantially parallel to the base of the belt such that the tine mounting bore substantially aligns with said cleat bore when said tine bodies are mounted on said belt, wherein each tine body has a cleat aperture therein substantially equal in dimension to the dimension of said cleats, and at least one flexible tine extending therefrom, said cleat aperture intersecting the tine mounting bore, each of said tine bodies being mounted on said belt by fitment of said cleat into said cleat aperture;

a means for detachably attaching said tine bodies to said belt through said tine mounting bore and at least one of said cleat bores.

2. A flexible endless conveyor as set forth in claim 1 wherein the elastomeric base of the belt has embedded therein at least one reinforcement layer.

3. A flexible endless conveyor as set forth in claim 1 wherein said molded elastomeric cleat is of rectangular shape with the largest dimension of the rectangle being in the transverse direction of the belt.

4. A flexible endless conveyor as set forth in claim 1 wherein each tine body is detachably attached to a single cleat by a rod which extends through the tine mounting bore and the cleat bore.

5. A flexible endless conveyor as set forth in claim 4 further comprising in combination a means for preventing transverse movement of said rod within said cleat bore and tine mounting bore.

6. A flexible conveyor as set forth in claim 1 wherein said elastomeric base contains at least one reinforcing layer embedded therein.

7. A flexible conveyor as set forth in claim 1 wherein said cleat is rectangular.

8. A flexible conveyor as set forth in claim 1 wherein said cleat is T-shaped.

9. A flexible conveyor as set forth in claim 1 further comprising a bushing molded into each cleat, said bore extending through said bushing.

10. A crop pickup system comprising, in combination:

a frame;

a flexible endless conveyor positioned within said frame;

a means for positioning, supporting, and driving said flexible endless conveyor within said frame, wherein said flexible endless conveyor comprises at least one elastomeric belt having a longitudinal direction and a transverse direction and elastomeric base and a plurality of integrally molded elastomeric cleats raised from the base and oriented in a plurality of rows transverse across the belt with transversely adjacent cleats interrupted by a space exceeding one-half the transverse dimension of said cleats, each of said cleats having a cleat bore therethrough with an axis parallel to the base of the belt, said cleat bores being aligned substantially perpendicular to the longitudinal direction of the belt;

a plurality of tine bodies mounted on said belt, each tine body having a tine mounting bore therethrough with an axis substantially parallel to the base of the belt such that the tine mounting bore substantially aligns with said cleat bore when said tine bodies are mounted on said belt, each of said tine bodies having a cleat aperture therein substantially equal in dimension to the dimension of said cleats and having a tine mounting bore intersecting said cleat aperture such that said tine mounting bore substantially aligns with said cleat bore when said tine bodies are mounted on said cleat, said tine bodies having at least one flexible tine attached thereto and wherein each of said tine bodies are mounted on a single cleat by a means for detachably attaching through said tine mounting bore and cleat bore.

11. A crop pickup system as set forth in claim 10 wherein the means for positioning and supporting said flexible endless conveyor is a head pulley rotatably attached to said frame and at least one tail pulley rotatably attached to said frame in fixed relation to said head pulley with means for driving the flexible endless conveyor.

12. A flexible endless conveyor for a harvester pickup apron comprising in combination:

at least one elastomeric belt having a longitudinal direction and a transverse direction and an integral, unitary, elastomeric base with a plurality of integrally molded elastomeric cleats raised from the base and oriented in a plurality of transverse rows across the belt with transversely adjacent cleats interrupted by a space exceeding one-half the transverse dimension of said cleats, each of said cleats having a cleat bore therethrough with an axis parallel to the base, said cleat bores being aligned substantially perpendicular to the longitudinal direction of the belt;

a plurality of tine bodies mounted on said belt to abuttingly rest on the base, each tine body having a tine mounting bore therethrough with an axis substantially parallel to the base of the belt such that the tine mounting bore substantially aligns with said cleat bore when said tine bodies are mounted on said belt, said tine bodies having at least one flexible tine extending therefrom;

a means for detachably attaching said tine bodies to said belt through said tine mounting bore and at least one of said cleat bores.

13. A flexible endless conveyor for a harvester pickup apron comprising in combination:

at least one elastomeric belt having a longitudinal direction and a transverse direction and elastomeric base with a plurality of integrally molded elastomeric cleats raised from the base and oriented in a plurality of transverse rows across the belt with transversely adjacent cleats interrupted by a space exceeding one-half the transverse dimension of said cleats, each of said cleats having a cleat bore with an axis parallel to the base, said cleat bores being aligned substantially perpendicular to the longitudinal direction of the belt;

a plurality of tine bodies mounted on said belt between transversely adjacent cleats, each of said tine bodies being composed of two mirror image portions, each of said portions having a pin extending therefrom positioned on the portion such that said pin aligns with and fits within the cleat bore of the cleat directly adjacent to each portion, each of said mirror image portions having at least one flexible tine extending therefrom.

* * * * *